E. A. BANSCHBACH.
VEHICLE SUPPORT.
APPLICATION FILED OCT. 17, 1919.
1,405,656.
Patented Feb. 7, 1922.
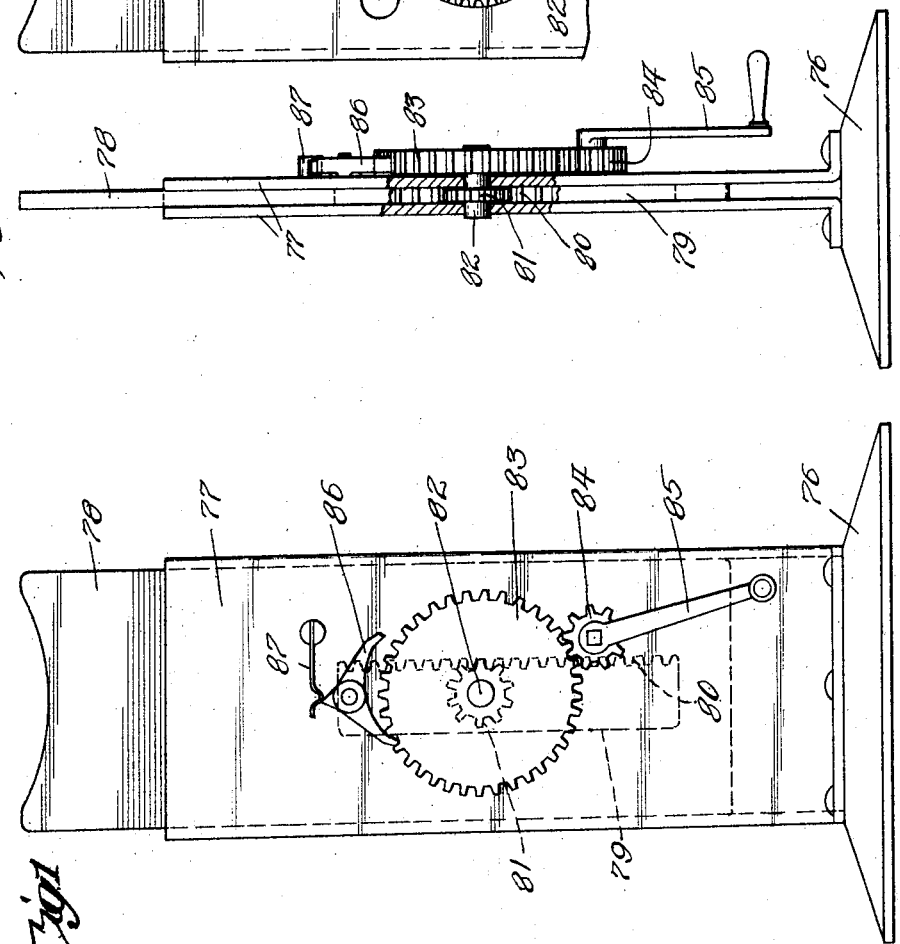

UNITED STATES PATENT OFFICE.

EDWARD A. BANSCHBACH, OF CHICAGO, ILLINOIS.

VEHICLE SUPPORT.

1,405,656.     Specification of Letters Patent.     Patented Feb. 7, 1922.

Application filed October 17, 1919. Serial No. 331,281.

*To all whom it may concern:*

Be it known that I, EDWARD A. BANSCHBACH, a citizen of the United States, residing at Chicago, in the county of Cook and State of Illinois, have invented certain new and useful Improvements in Vehicle Supports, of which the following is a specification.

This invention has for its object the provision of devices of the class named which shall be of improved construction and operation.

The invention is exemplified in the combination and arrangement of parts shown in the accompanying drawings and described in the following specification, and it is more particularly pointed out in the appended claims.

In the drawings—

Figs. 1 and 2 are elevations at right angles to one another showing a lifting jack embodying this invention; and Fig. 3 illustrates a modification of the part of the invention shown in Figs. 1 and 2.

One of the most inconvenient features in removal and replacement of vehicle wheels and tires is the difficulty experienced in raising the vehicle so as to free the wheel from the weight upon it. The difficulty in this operation arises from the fact that the jack used for the purpose must be placed under the axle or body of the vehicle inside of the wheel so that it will not interfere with the removal of the wheel or tire. The position of the jack is very difficult of access and makes its operation inconvenient.

The present invention comprises a jack which may be applied at the end of the hub outside of the wheel of the vehicle and a support which is set beneath the axle inside of the wheel after the vehicle as been lifted. When the support is in place the jack may be lowered and removed so that it will not interfere with the manipulations upon the wheel or tire. Some convenient forms of props for such purpose are illustrated in my copending application, Serial No. 447,366, filed February 23, 1921.

In Figs. 1 and 2 is shown a form of lifting jack especially adapted for operation beneath the outer end of a vehicle hub for lifting the vehicle to permit the insertion of a support beneath the axle on the inner side of the wheel. The jacks shown in Figs. 1 and 2 are provided with a base 76 having a pair of plates 77 extending upwardly therefrom to form a supporting standard. A lifting bar 78 is slidably mounted between the plates 77 and is longitudinally slotted, as shown at 79. The bar is provided with a series of rack teeth 80 on one side of the slot 79 arranged to mesh with teeth of a pinion 81 supported by a stud shaft 82 journaled in the plates 77. The shaft 82 is provided with a spur gear 83 rigidly secured thereto adjacent the outer face of one of the plates 77 and a pinion 84 meshes with the gear 83 and is provided with a hand crank 85 for rotating the gear to raise or lower the lifting bar 78. A pawl 86 engages the teeth on the spur gear 83 and is adjustable into position to permit rotation of the gear 83 in either direction. The pawl 86 is held in its adjusted positions by a spring 87.

A slight modification of the jack is shown in Fig. 3 in which a worm 88 having a hand crank 89 is substituted for the pinion 84. In this form of jack the pawl is unnecessary since the worm holds the gear against rotation in either direction.

I claim:—

1. A lifting jack comprising a laterally extending base member, upright plates having the lower ends thereof bent outwardly to form feet and secured to said base member, a lifting bar comprising a relatively thin wide plate positioned between said upright plates and having sliding contact with the inner face of each of said plates, said bar having a longitudinally extending slot therein, a pinion positioned in said slot, a supporting shaft for said pinion journaled in said upright plates, a gear wheel connected with said shaft and arranged adjacent the outer face of one of said upright plates, a hand crank having operative connection with said gear wheel, and a pawl for holding said gear wheel against rotation.

2. A lifting jack comprising a relatively flat base member and a standard projecting therefrom, said standard comprising a plate centrally bent upon itself and having the two parts thereof brought into close parallel relation to one another to form a wide narrow channel, a relatively thin wide plate constituting a lifting bar and occupying substantially the full width of said channel and having sliding connection with the inner face of each side of said channel and having one edge arranged in sliding connection with the bent portion of said standard plate, said lifting bar having a longitudinally extending slot therein, a pinion positioned in said slot between the sides of said channel, a shaft to which said pinion is secured, said shaft being journaled in the sides of said standard, rack teeth formed at the edge of said slot and engaging said pinion, and means connected with said shaft for rotating said pinion to raise said lifting bar.

In testimony whereof I have signed my name to this specification on this 14th day of October, A. D. 1919.

EDWARD A. BANSCHBACH.